Jan. 30, 1934.  E. L. BAKER  1,945,390
FUEL REGULATOR
Filed May 21, 1932   3 Sheets-Sheet 1
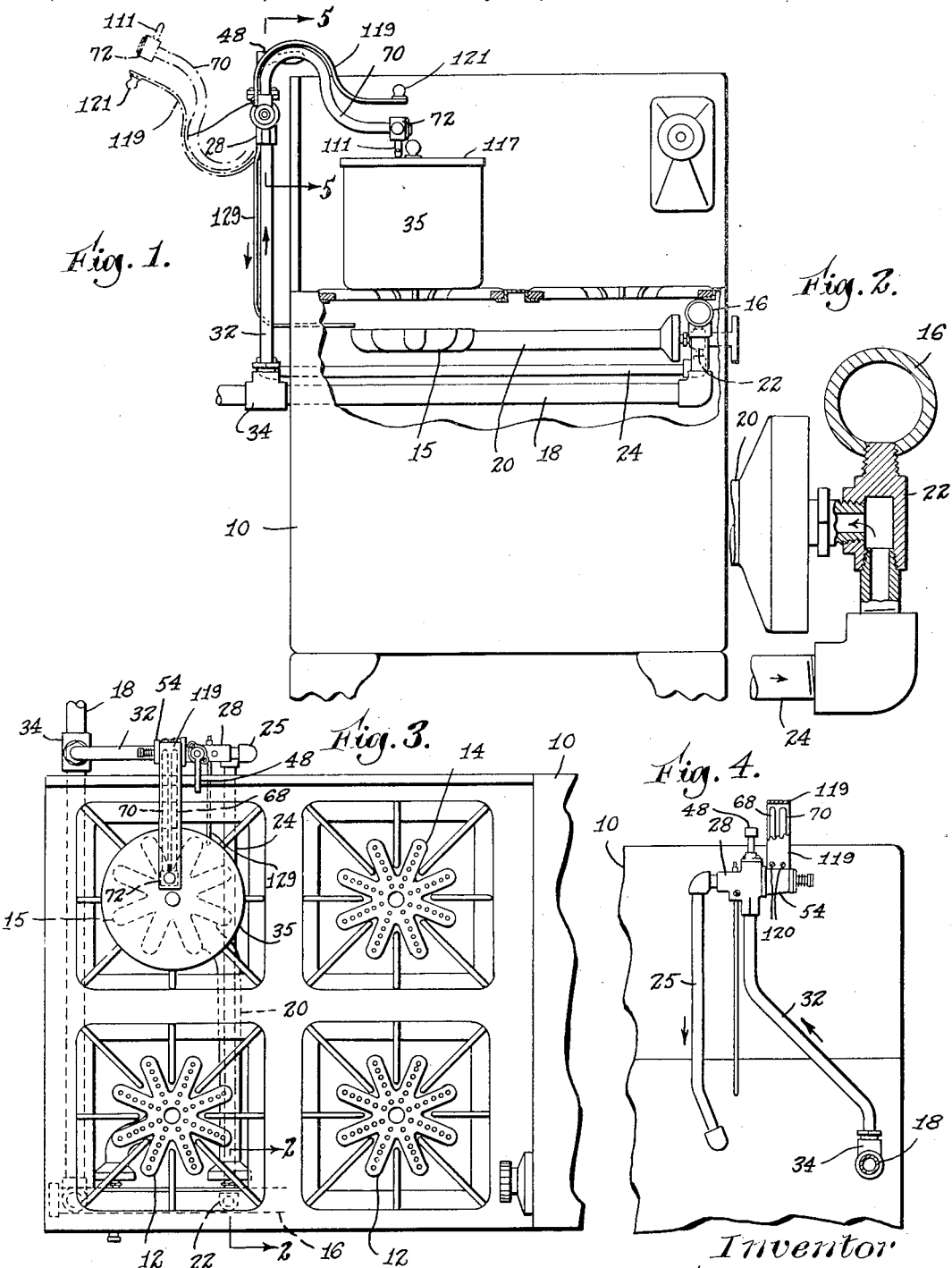
Inventor
E. L. Baker
by Kenway + Witter
Attorneys

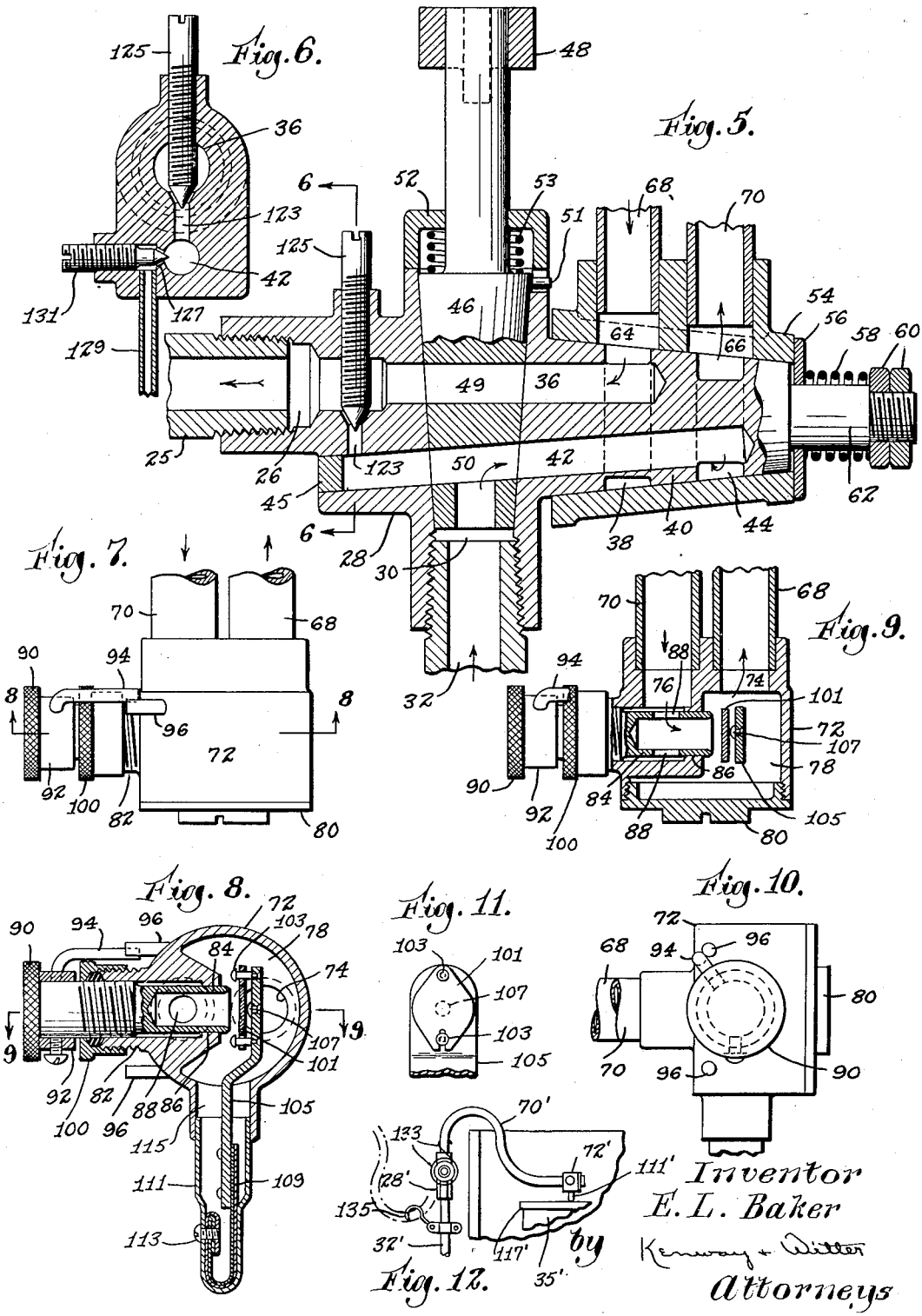

Jan. 30, 1934.                E. L. BAKER                1,945,390
                              FUEL REGULATOR
                    Filed May 21, 1932        3 Sheets-Sheet 3
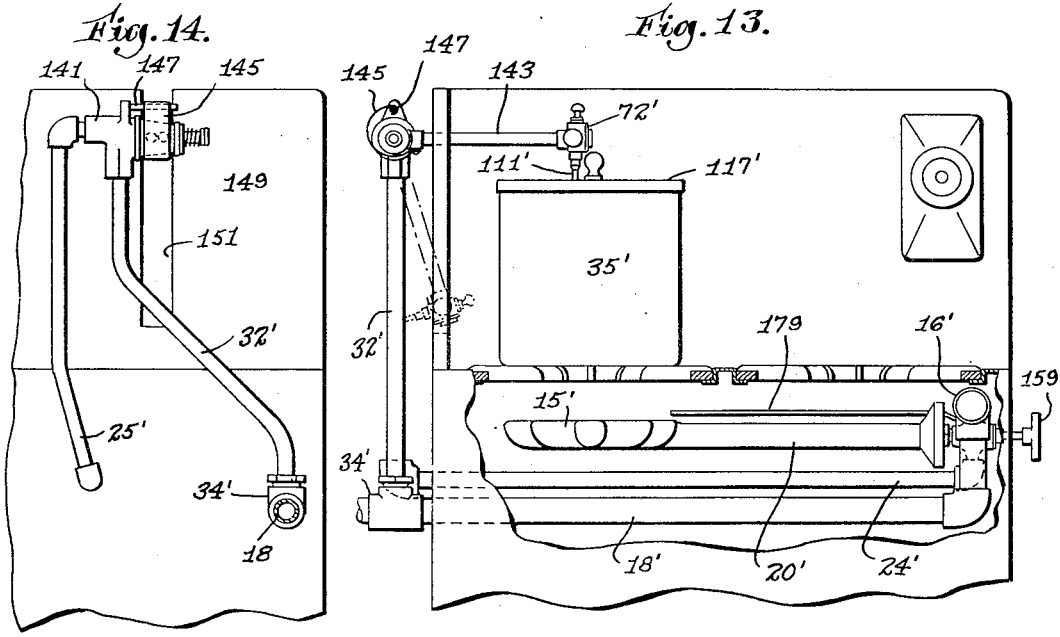
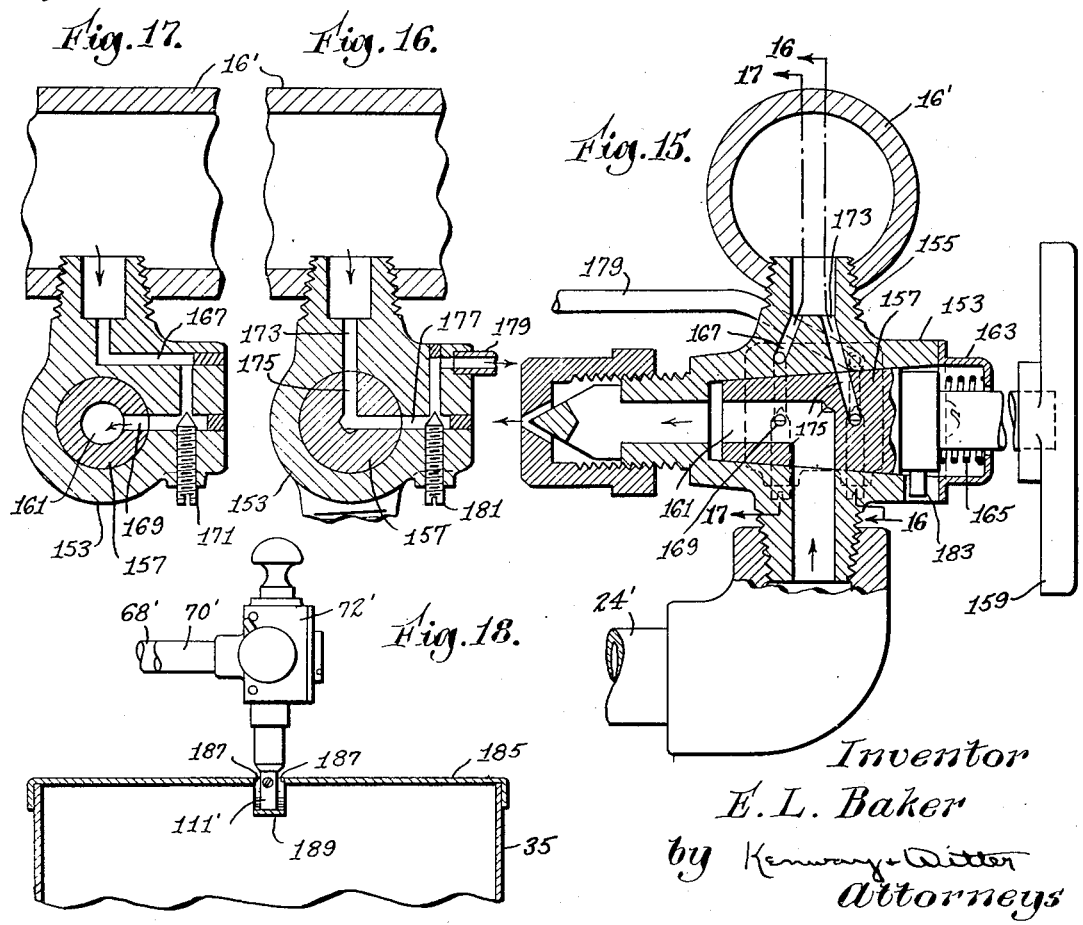
Inventor
E. L. Baker
by Kenway & Witter
Attorneys Patented Jan. 30, 1934

1,945,390

UNITED STATES PATENT OFFICE 1,945,390

FUEL REGULATOR

Eugene L. Baker, Taunton, Mass.

Application May 21, 1932. Serial No. 612,755

11 Claims. (Cl. 236—20)

This invention relates to fuel regulators, and more particularly to the art of automatic control of a burner in accordance with the vapor heat generated within a vessel being heated by the burner. Devices have been heretofore proposed which automatically regulate the flow of gas to a burner in accordance with the heat of vapor given off from a vessel being heated by the burner, and one phase of my invention herein distinguishes from such devices in that no contact with the vapor is required, thus facilitating the operation of cooking or the like, eliminating the objectionable water of condensation heretofore resulting from the use of these devices, and rendering the device more convenient in use. The production of such an improved regulator for the purpose stated comprises one object of my invention.

Cooking vessels are ordinarily closed by relatively thin metal covers fitting the vessels sufficiently tight to confine most of the vapor heat therein, particularly if the fuel supply is properly regulated to eliminate overheating. My invention herein provides a fuel regulating device which may be used to control the heating of any such vessel without modifying the vessel or opening the same to the atmosphere. The vapor heat generated within these vessels contacts directly with the covers which are almost immediately heated thereby to the temperature of the vapor and, in accordance with one aspect of my invention, I provide a device, including a thermostatic member, to be engaged against these covers and function automatically in accordance with the heat received from the covers to control the fuel supply to the burner. Another object of the invention, therefore, resides in the provision of a fuel regulator of this nature which performs its heat-controlling function by contacting with an exterior surface, such as the cover, of a vessel heated by the burner.

More specifically, the invention embodies a member pivoted or otherwise mounted for movement toward and from a burner whereby it may be conveniently brought into contact with the covers of cooking vessels placed over the burner. The portion thereof contacting with the covers includes a thermostat so cooperating with the device as to regulate automatically the fuel supply to the burner in accordance with the heat generated within the vessel and transferred to the cover and thermostat. Means is also preferably combined with the device to make and maintain a proper contact with the covers, and other novel means is provided for regulating the amount of fuel which shall be allowed to pass to the burner. A further object of the invention is to provide an improved fuel-controlling device embodying these novel features.

These and other features of the invention will be best understood and appreciated from the following description of a preferred embodiment thereof, selected for purposes of illustration and shown in the accompanying drawings, in which Fig. 1 is a side elevation of a gas range, partially broken away and showing an embodiment of my invention;

Fig. 2 is an enlarged fragmentary sectional view taken on line 2—2 of Fig. 3;

Fig. 3 is a fragmentary plan view of the range;

Fig. 4 is a fragmentary rear view of the range;

Fig. 5 is an enlarged fragmentary sectional view taken on line 5—5 of Fig. 1;

Fig. 6 is a fragmentary sectional view taken on line 6—6 of Fig. 5;

Fig. 7 is a fragmentary plan view of a portion of the device shown in Fig. 1;

Fig. 8 is a sectional view taken on line 8—8 of Fig. 7;

Fig. 9 is a sectional view taken on line 9—9 of Fig. 8;

Fig. 10 is a side elevation of Fig. 7;

Fig. 11 is a fragmentary elevation of a portion of Fig. 8;

Fig. 12 is a fragmentary side elevation of a modified form of the invention;

Fig. 13 is a view like Fig. 1 but showing a modified form of the invention;

Fig. 14 is a fragmentary rear elevation thereof;

Fig. 15 is an enlarged sectional view of the gas controlling valve at the front of the range;

Figs. 16 and 17 are sectional views taken on lines 16—16 and 17—17 of Fig. 15; and Fig. 18 is a fragmentary view showing a further modified detail.

While my invention is especially applicable to the use of gaseous fuels, as illustrated in the accompanying drawings, it will be understood that in its proper sense it is not to be considered as thus limited, since it is well adapted to use with other fuels, such as electricity, for example.

The specific construction embodying a gas range 10, which I have illustrated in the drawings for the purpose of clearly disclosing my invention, will now be described. The range 10 has the usual front burners 12 and rear burners 14 and 15 and a gas-supplying manifold 16. Gas is supplied to the manifold 16 from a rearwardly-extending pipe 18.

The fuel regulator comprising my invention may be used in connection with any of the burners 12, 14 and 15 and may be so mounted as to cooperate with a vessel placed over any of such burners. I prefer, however, to illustrate the device as mounted adjacent to and movable toward and from one of the burners in a manner to cooperate with a cooking vessel placed thereover. I furthermore prefer that the device shall be mounted at the rear of the range 10 in a position to cooperate with one of the rear burners. In such position, the device is entirely out of the way, in no manner interferes with the usual use of the range, and furthermore leaves the front burners 12 free for other uses.

Gas is ordinarily supplied to the burners through valves or cocks threaded into the manifold 16 and in communication with the burners through pipes, such as the pipe 20 shown as leading to the burner 15. In order automatically to regulate the fuel supply to the burner 15 in accordance with my invention, I somewhat modify this connection thereto as follows. The standard valve which is threaded into the manifold at the end of the pipe 20 is removed and a connection 22 is substituted therefor. This connection closes the threaded opening into the manifold and provides communication from the pipe 20 to a pipe 24, extending rearwardly and then upwardly at 25 into communication with an outlet port 26 in a member 28. Gas is supplied to an inlet port 30 of this member through a downwardly-extending pipe 32 in communication with the main supply pipe 18 at 34. The gas supplied to the burner 15, therefore, passes through the member 28 and other cooperating mechanism now to be described, and this flow of gas is automatically regulated in accordance with the heat generated within a cooking vessel 35 placed over the burner, all as hereinafter described.

The outlet port 26 of the member 28 is extended inwardly at 36 and is in communication with an annular port 38 surrounding a conical portion 40 of the member. The inlet port 30 is in communication with a bore 42 in communication with an annular port 44 surrounding the conical portion 40, the opposite end of the bore 42 being plugged at 45. The body portion 46 of a hand valve 48 in the member 28 is drilled transversely at 49 and 50 so that, in the position shown in Fig. 5, the ports 36 and 42 are open therethrough, rotation of the valve 48 through the 90° allowed by a stop pin 51 being adapted to close these ports. A cap 52 and a spring 53 serve to hold the valve 46 tightly within its bore.

A conical bushing 54 is closely mounted and pivotally movable on the conical portion 40 of the member 28, a washer 56, spring 58 and a pair of check nuts 60 on a stud 62 being adapted to hold the bushing in tight contact with the member. Two outwardly-directed bores 64 and 66 are in communication with the annular ports 38 and 44 and the ends of two pipes 68 and 70 are tightly seated into these bores. These pipes extend outwardly in parallel directions, as shown in Figs. 1 and 3, and carry a member 72 at their outer ends, the outer ends of the pipes respectively extending into bores 74 and 76 in the member. The bore 74 opens into a main chamber 78, the outer end of which is closed by a threaded plug 80.

Threaded into a laterally-projecting portion 82 of the member 72 is a sleeve having a reduced inner portion 84 tightly fitting the reduced portion 86 of the bore. The port 76 opens into the sleeve through lateral openings 88, thus providing gas communication into the chamber 78. The sleeve may be adjusted longitudinally by rotating its knurled head 90, and the extent of this adjustment may be limited by a collar 92 carrying a pin 94 operating between two stops 96, a set screw 98 being provided for securing the collar to the sleeve. The sleeve is made gas tight by means of a packing and a threaded bushing 100.

The inner end of the sleeve 84 provides an annular valve seat with which cooperates a plate valve 101 loosely mounted on pins 103 on the upper end of an arm 105, a pressure exerting abutment 107 for the valve being provided on the arm rearwardly of the valve and within the peripheral outline of the seat.

The arm is mounted on one end of a U-shaped bi-metallic plate 109 closely seated within the closed and restricted end of a relatively thin sheet metal cupped member 111. The other end of the plate 109 is secured to the member 111 by a screw 113 and the relatively larger open end of the member is fitted tightly into and closes a downwardly-extending port 115 into the chamber 78. The relatively thin wall of the member 111 readily transmits heat to the plate 109, which thereupon is adapted to bend inwardly and cause closing of the valve 101 against the annular end of the sleeve 84. The valve is floatingly mounted by the pins 103 and, the abutment 107 being within the peripheral outline of the valve seat, causes the valve to adjust itself automatically to the seat.

When the vessel 35 is placed over the burner 15, the member 54, including the pipes 68 and 70, may be moved from the broken line position (Fig. 1) to the full line position, wherein the thermostatic member, within the cup 111, is in heat-conductive contact with the cover 117 of the vessel. The conical mounting of the member 54 in cooperation with the spring 58 provides a substantial frictional resistance to the pivotal movement of the member, and this resistance serves the useful purpose of holding the thermostatic member in firm contact with the cover 117 and the cover firmly in place on the vessel. To aid in moving the member 28 and in placing the thermostatic member in proper contact with the cover, I provide a resilient handle connection in the form of a spring arm 119. One end of this arm is secured to the member 28 by screws 120 and the other end carries a knob 121. By grasping this knob and thus engaging the device with the vessel cover through the medium of the spring arm, the engagement is made with the proper amount of pressure without danger of injuring the device.

It is desirable that the burner 15 shall continue to be lighted so long as the hand valve 46—48 is open, and to assure this function I provide a bypass 123 from the bore 42 to the outlet port 26 and the flow of gas therethrough may be adjustably controlled by a screw 125. Sufficient gas is allowed to pass through this bypass to keep the burner lighted even though the valve 101 should be entirely closed. It sometimes happens that a sudden draft of air striking the burner will cause this low flame to be extinguished, and I preferably provide a second bypass and pilot light for relighting the burner under these circumstances. This second bypass includes a port 127 from the bore 42 and a tubular conduit 129 for conducting gas to the burner and providing the pilot light. The flow of this gas may be controlled by a screw 131.

It will be understood that the thermostatic member may be mounted and moved in any manner desired, the essential requirement being that it may be brought into contact with an exterior surface of the vessel over the burner to be controlled. In Fig. 12, I have illustrated the member 28' and its cooperating parts as normally moved toward the burner under the action of a spring 133, the thermostatic member being thereby held resiliently in contact with the vessel cover. The device may be held in the inoperative position by any convenient means, such as a latch 135.

It is believed that the construction, operation and advantages of my invention will now be clearly understood. Any gas range can be readily and easily equipped with one or more of the devices illustrated merely by removing the standard gas cocks thereof and substituting the member 22 and the cooperating connections illustrated. When the hand valve 46—48 is closed, no gas is permitted to flow to the burner, and when this valve is opened the burner may be lighted in the usual manner. The vessel being located over the lighted burner, the operator grasps the knob 121 and swings the thermostatic member into contact with the cover 117. With the valve 46 fully open, a full portion of gas will continue to flow to the burner until sufficient steam is generated in the vessel to heat the cover, it being clear that such steam immediately rises into contact with the cover and the heat immediately passes through the relatively thin cover and cup 111 to the thermostatic plate 109. The plate thereupon bends inwardly and moves the valve 101 toward the seat 84, thus diminishing the flow of gas to the burner. The close heat-conductive contact of the thermostatic plate and cover renders the device extremely sensitive and automatically provides a uniform flow of gas to the burner and prevents too rapid boiling of the liquid in the vessel. Should the valve 101 be closed tightly upon its seat, the bypass 123 will provide sufficient gas to keep the burner lighted, and should the burner become completely extinguished the pilot light provided by the conduit 129 will relight the same.

The closing of the hand valve 46—48 completely cuts off all supply of gas to the burner and pilot light. The flow of gas allowed by the device can be very nicely and conveniently regulated by adjusting the knurled head 90, thus moving the sleeve 84 toward and from the valve plate 101.

In Figs. 13–17 I have illustrated a somewhat modified arrangement of the invention as above described, the most important feature of this modification being that the hand valve for manually controlling the gas to the burner 15' is located at the front of the range (Fig. 13) instead of at the rear thereof (Figs. 1 and 3). The burner and other parts, which are substantially the same as those shown in Figs. 1, 3 and 4, are indicated in Figs. 13 and 14 by the same reference characters primed.

The member 141 is the same as member 28 (Fig. 5) with the hand valve 46 and bypasses 123 and 127 eliminated, and the arm 143 pivotally mounted on the member 141 is the same as arm 68—70 except that it extends straight out from the member 141. The thermostatic member 111' thereof is adapted to be held in contact with the cover 117' by a leaf spring 145 attached at one end to the arm 143 and having a hook at its other end engaging a pin 147 on the member 141. The spring normally draws the arm downwardly to the position shown in broken lines in Fig. 13, thereby serving to hold the thermostatic member in firm contact with the cover. The splash apron 149 of the range is slotted at 151 whereby to receive the arm 143 when not in use. Thus, in its idle position the arm is out of the way, permitting free use of the range, and its most delicate member 111' is in a position protected from possible injury.

The flow of gas to the burner is as follows: main supply pipe 18', pipe 32', member 141, arm 143, thermostatic valve (Fig. 8), arm 143, member 141, pipe 25', pipe 24', hand control valve body 153, pipe 20' and burner 15'. The valve body 153 has a portion 155 threaded into the manifold 16' in place of the standard gas cock which is removed. The conical body portion 157 of a hand valve 159 mounted in the valve body 153 is shown in the open position in Fig. 15. In this position, gas may flow freely to the burner through the port 161. A cap 163 and spring 165 serve to hold the valve 157 tightly within its conical bore.

Provision is made for a limited continuous flow of gas to the burner as well as providing a pilot light therefor, both from the manifold 16' as follows. The continuous flow of gas to the burner, illustrated in Fig. 17, comprises a port 167 leading into the manifold 16' and cooperating with a port 169 through the valve 157. The flow of gas through these ports may be regulated by a screw 171. The flow of gas for the pilot light, illustrated in Fig. 16, comprises a port 173 leading into the manifold 16', a right angular port 175 through the valve 157, a port 177 and a pilot light conduit 179. The flow of gas through these ports may be regulated by a screw 181. Rotation of the valve 157—159 through the 90 degrees allowed by a stop pin 183 is adapted to close the ports 161, 169 and 175, thus shutting off all flow of gas through the valve body 153.

When it is desired to use the burner 15', the hand valve 159 is opened and the burner lighted in the usual manner. The main flow of gas to the burner passes through the arm 143 and is controlled by the thermostatic member 111', the continuous flow of gas to keep the burner lighted and provide the pilot light being supplied from the manifold 16'. With the thermostatic member 111' in contact with the cover 117', the full flow of gas will continue to the burner until sufficient steam is generated in the vessel to heat the cover and operate the thermostat (Fig. 8), thus closing the valve 101 onto its seat 84 and diminishing the flow of gas through the arm and to the burner, all as heretofore described.

While I have above described my improved regulator as particularly adapted to function by contact with the exterior surface or cover of the vessel being heated, it will be understood that the same readily lends itself to use by direct contact of the steam therewith, if desired. One application of this method of use is illustrated in Fig. 18, wherein the cover 185 is sheared at 187 to provide a portion 189 which is bent inwardly or downwardly. The thermostatic member 111' is seated on this sheared portion and generated steam passes directly thereto from the open opposite sides of the sheared portion. The opening thus provided is relatively small and the direct contact of the steam with the member 111' serves to render the device extremely sensitive.

Having thus described my invention, what I claim as new and desire to secure by Letters Patent is:

1. In a device of the class described, a burner, means for conducting fuel to the burner, fuel controlling means including a metallic thermostatic member mounted therein to contact with the inner surface of a relatively thin metallic wall the opposite and outer surface of which is adapted to be engaged with a vessel on the burner, and means mounting the controlling means for movement toward and from the burner whereby said outer surface may be brought into heat-conductive contact with an exterior surface of said vessel, heat transmission directly from said exterior surface of the vessel to the member through said wall causing movement of the thermostatic member and a reduction in the flow of fuel to the burner.

2. In a range and a burner thereof, means for conducting fuel to the burner and including a pivotally-mounted member movable about its pivotal axis toward and from the burner, and means including a thermostatic member on the free end of the first-named member for controlling automatically the flow of fuel to the burner, the thermostatic member being adapted to be placed into heat-conductive relation with a vessel on the burner and heat transmission from the vessel to the member causing movement of the thermostatic member and a reduction in the flow of fuel to the burner.

3. The device set forth in claim 2, wherein the first-named member is pivoted substantially on a horizontal axis and movable to bring the free end of the first-named member into contact with the top wall of the vessel.

4. The device set forth in claim 2, wherein frictional resistance is provided against pivotal movement of the first-named member and a spring arm is carried by the member for moving it into contact with the vessel.

5. The device set forth in claim 2, plus resilient means for holding the pivoted member with its free end in resilient contact with the vessel.

6. In a gas range and burner thereof, means for conducting gas to the burner and including a pivotally-mounted member movable about its pivotal axis toward and from the burner and having gas conducting and return ports therethrough, and means including a valve and a cooperating thermostatic member on the free end of the first-named member for controlling automatically the flow of gas through said ports, the thermostatic member being adapted to be placed into heat-conductive relation with a vessel on the burner and heat transmission from the vessel to the member causing closing movement of the valve.

7. In a gas controlling mechanism, a valve body having gas inlet and outlet ports, a member pivotally mounted on the body and having gas conducting and return ports through which gas is adapted to flow from said inlet to said outlet ports, and a valve on the free end of said member for controlling the flow of gas through the ports.

8. The device set forth in claim 6, wherein the first-named member is pivoted on a gas conducting body at the rear side of the range and movable to cooperate with a vessel on a rear burner thereof, and a gas controlling hand valve in said body.

9. The device set forth in claim 6, wherein the first-named member is pivoted at the rear side of the range and movable to cooperate with a vessel on a rear burner thereof, and a gas controlling hand valve at the front of the range for controlling the flow of gas to said burner.

10. The device set forth in claim 6, wherein the first-named member is pivoted at the rear side of the range and movable to cooperate with a vessel on a rear burner thereof, a gas controlling hand valve at the front of the range for controlling the flow of gas to said burner, and means providing a continuous flow of gas through the hand valve to the burner from the manifold at the front of the range when the hand valve is open.

11. The device set forth in claim 6, wherein the first-named member is pivoted at the rear side of the range and movable to cooperate with a vessel on a rear burner thereof, a gas controlling hand valve at the front of the range for controlling the flow of gas to said burner, and means providing a continuous flow of gas through the hand valve to the burner and through a conduit to provide a pilot light for the burner, both from the manifold at the front of the range when the hand valve is open.

EUGENE L. BAKER.